United States Patent
Voorman et al.

(10) Patent No.: US 7,433,292 B2
(45) Date of Patent: Oct. 7, 2008

(54) OPTICAL DISK SYSTEM WITH DELAY-DIFFERENCE DETECTOR WITHOUT DELAY LINES

(75) Inventors: Johannes Otto Voorman, Geldrop (NL); Gerben Willem De Jong, Eindhoven (NL); Johannes Hubertus Antonius Brekelmans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/523,385

(22) PCT Filed: Jul. 21, 2003

(86) PCT No.: PCT/IB03/03293

§ 371 (c)(1),
(2), (4) Date: Feb. 1, 2005

(87) PCT Pub. No.: WO2004/015692

PCT Pub. Date: Feb. 19, 2004

(65) Prior Publication Data

US 2006/0072393 A1    Apr. 6, 2006

(30) Foreign Application Priority Data

Aug. 6, 2002    (EP)    .................................. 02078239

(51) Int. Cl.
G11B 7/00    (2006.01)
(52) U.S. Cl. .............................. 369/124.14; 369/124.12
(58) Field of Classification Search ........................ None
See application file for complete search history.

(56) References Cited

U.S. PATENT DOCUMENTS 5,258,968 A * 11/1993 Matsuda et al. .......... 369/44.35

(Continued)

FOREIGN PATENT DOCUMENTS

EP    1096481 A2    5/2001

OTHER PUBLICATIONS

A BiCMOS 1X to 5X Combined Analog Frontend IC for DVD-ROM & Movie Players from IEEE 1998 Custom Integrated Circuits Conference, pp. 14.6.1 to 14.6.4 or pp. 333 to 336.

*Primary Examiner*—Joseph Feild
*Assistant Examiner*—Christopher R Lamb
(74) *Attorney, Agent, or Firm*—Michael E. Belk

(57) ABSTRACT

Optical disk systems comprising photo detectors (1) for detecting optical disks comprising amplifiers and slicers (2-5) and delay-difference detectors (6) for detecting delay differences in sliced amplified detection signals are improved by installing delaylineless delay-difference detectors (6) comprising combinatorial-logic circuits (7,8) like inverters, ORs, NORs, ANDs, NANDs and sequential-logic circuits (11-18) like SetResetFlipFlops. Without the prior art delay lines, said delay-difference detectors (6) are of a lower complexity and low costly and can be well integrated. By introducing a first pair of sequential-logic circuits (11,12,15,16) for detecting delay differences between rising edges and a second pair of sequential-logic circuits (13,14,17,18) for detecting delay differences between falling edges, both kinds of edges are being used and the influence of time-jitter is less compared to the situation where just one kind of edge is used. Said delay-difference detector (6) further comprises an analog adder/subtracter (9) for adding/subtracting-logic circuit output signals and low pass filter(s) (10) located before or after said adder/subtracter (9).

8 Claims, 4 Drawing Sheets

U.S. PATENT DOCUMENTS

Figure 1:
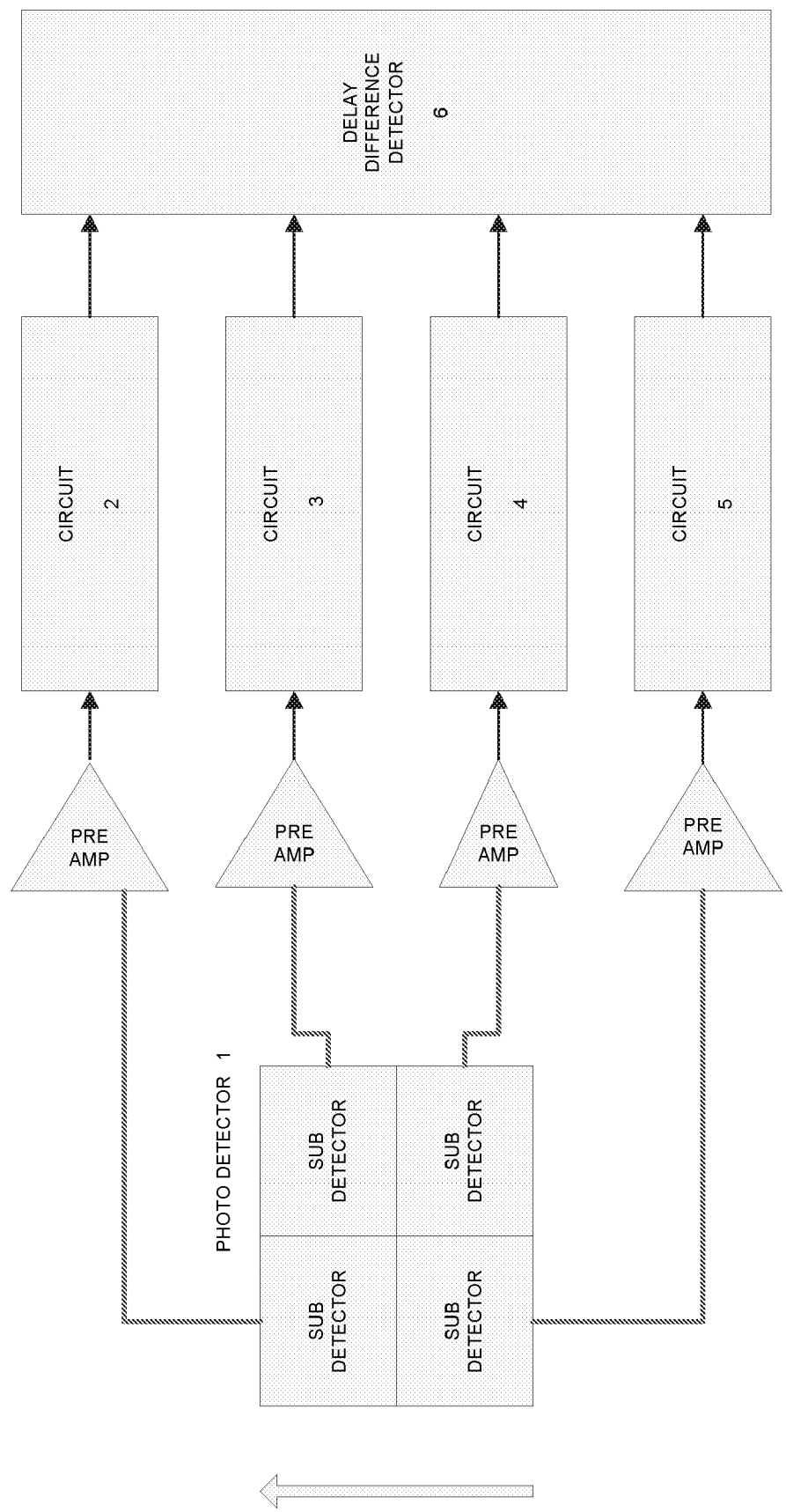

| | | | |
|---|---|---|---|
| 5,808,979 A | 9/1998 | Ishibashi et al. | |
| 5,901,120 A | 5/1999 | Matsui | |
| 6,775,210 B1 * | 8/2004 | Tateishi | 369/44.41 |
| 6,940,799 B1 * | 9/2005 | Ma et al. | 369/53.25 |

* cited by examiner

OPTICAL DISK SYSTEM WITH DELAY-DIFFERENCE DETECTOR WITHOUT DELAY LINES

The invention relates to an optical disk system comprising at least one photo detector for detecting at least a part of said optical disk and in response generating detection signals and comprising at least one amplifier for amplifying detection signals and comprising at least one slicer for slicing amplified detection signals and comprising at least one delay-difference detector for detecting delay differences in sliced amplified detection signals.

The invention also relates to a delay-difference detector for use in an optical disk system comprising at least one photo detector for detecting at least a part of said optical disk and in response generating detection signals and comprising at least one amplifier for amplifying detection signals and comprising at least one slicer for slicing amplified detection signals and comprising at least one delay-difference detector for detecting delay differences in sliced amplified detection signals, and to a method for use in an optical disk system and comprising the steps of detecting at least a part of said optical disk and of in response generating detection signals and of amplifying detection signals and of slicing amplified detection signals and of detecting delay differences in sliced amplified detection signals.

Such an optical disk system is for example a Compact Disk system or CD system for playing CDs and/or recording CDs or is for example a Digital Versatile Disk system or DVD system for playing DVDs and/or recording DVDs and/or is for example a Blu-ray Disk system or BD system etc.

A prior art optical disk system is known from the article A BiCMOS 1× to 5×Combined Analog Frontend IC for DVD-ROM & MOVIE Players from IEEE 1998 CUSTOM INTEGRATED CIRCUITS CONFERENCE, pages 14.6.1 to 14.6.4 or pages 333 to 336.

The delay-difference detector in this article comprises adjustable delay lines, which are disadvantageous, for example when integrating said amplifier and slicer and delay-difference detector on the photo detector integrated-circuit. This integrating is desirable to avoid delay differences caused by path length differences of transmission lines between photo detector integrated-circuit (comprising at least two photo detectors or comprising at least one photo detector having at least two subdetectors) and delay-difference detector.

It is an object of the invention, inter alia, of providing an optical disk system as defined in the preamble in which the delay-difference detector no longer needs any delaylines.

The optical disk system according to the invention is characterized in that said delay-difference detector is delayline-less and comprises combinatorial-logic circuits and sequential-logic circuits.

By introducing said delaylineless delay-difference detector comprising combinatorial-logic circuits and sequential-logic circuits, the delay-difference detector will detect any delay differences in sliced amplified detection signals thereby solely using combinatorial-logic circuits and sequential-logic circuits.

The invention is based upon an insight, inter alia, that in optical disk systems, the sliced amplified detection signals will have the same frequency, which allows the use of low complex (and delaylineless) delay-difference detectors, and is based upon a basic idea, inter alia, that such a low complex delay-difference detector can be realized by solely using combinatorial-logic circuits like for example inverters, ORs, NORs, ANDs, NANDs etc. and sequential-logic circuits like for example SetResetFlipFlops etc.

The invention solves the problem, inter alia, of providing an optical disk system in which the delay-difference detector is of the lowest complexity, and is advantageous, inter alia, in that such a delay-difference detector can be integrated on the photo detector integrated-circuit well.

A first embodiment of the optical disk system according to the invention as defined in claim 2 is advantageous in that said delay-difference detector comprises a first pair of sequential-logic circuits for detecting delay differences between rising edges and comprises a second pair of sequential-logic circuits for detecting delay differences between falling edges.

By introducing said first pair and said second pair and thereby using both kinds of edges, the influence of time-jitter is less compared to the situation where just one kind of edge is used.

A second embodiment of the optical disk system according to the invention as defined in claim 3 is advantageous in that said delay-difference detector further comprises at least one analog adder/subtracter for adding/subtracting sequential-logic circuit output signals.

By introducing said analog adder/subtracter, the differences between the sequential-logic circuit output signals of each one of said pairs of sequential-logic circuits can be established, and the sum of said differences can be established. The analog adder/subtracter may be in the form of a node ($\Sigma I=0$) with for example a current-to-voltage converter like for example a resistor for converting currents into voltages (in case of said sequential-logic circuit outputs generating currents or in case of said sequential-logic circuit outputs generating voltages to be supplied to voltage-to-current converters).

A third embodiment of the optical disk system according to the invention as defined in claim 4 is advantageous in that said delay-difference detector comprises at least one low pass filter coupled to an output of said at least one analog adder/subtracter.

By introducing said low pass filter at the end of said delay-difference detector, just one low pass filter is needed.

A fourth embodiment of the optical disk system according to the invention as defined in claim 5 is advantageous in that said delay-difference detector comprises at least one low pass filter located between at least one sequential-logic circuit and said at least one analog adder/subtracter.

By introducing said low pass filter between sequential-logic circuits and analog adder/subtracter, more than one low pass filter will be needed, with each low pass filter possibly getting individual characteristics.

Of course, because of parasitic capacitances, low pass filters are intrinsically present.

It should be noted that the delay-difference detector according to the invention is more linear for noise than known prior art delay-difference detectors (in the delay-difference detector according to the invention the noise does no longer bias the values of the delay differences). For the latter reason it might well be that a noise filter (preceding the delay-difference detector) could be omitted in practice, which would further reduce the complexity of the delay-difference detector.

A fifth embodiment of the optical disk system according to the invention as defined in claim 11 is advantageous in that said photo detector comprises several subdetectors segmented by division lines which are positioned as tilted by an angle in a range 45±(0-40) degrees with respect to a track direction for said generating of detection signals for reading data from said optical disk.

By introducing tilted division lines, a higher cross-talk suppression and a larger radial-tilt margin are got, a boosting of most critical high frequency signals is got, and a higher signal-to-noise ratio is got.

Embodiments of the delay-difference detector according to the invention and of the method according to the invention correspond with the embodiments of the optical disk system according to the invention.

These and other aspects of the invention will be apparent from and elucidated with reference to the embodiments(s) described hereinafter.

Figure 2:
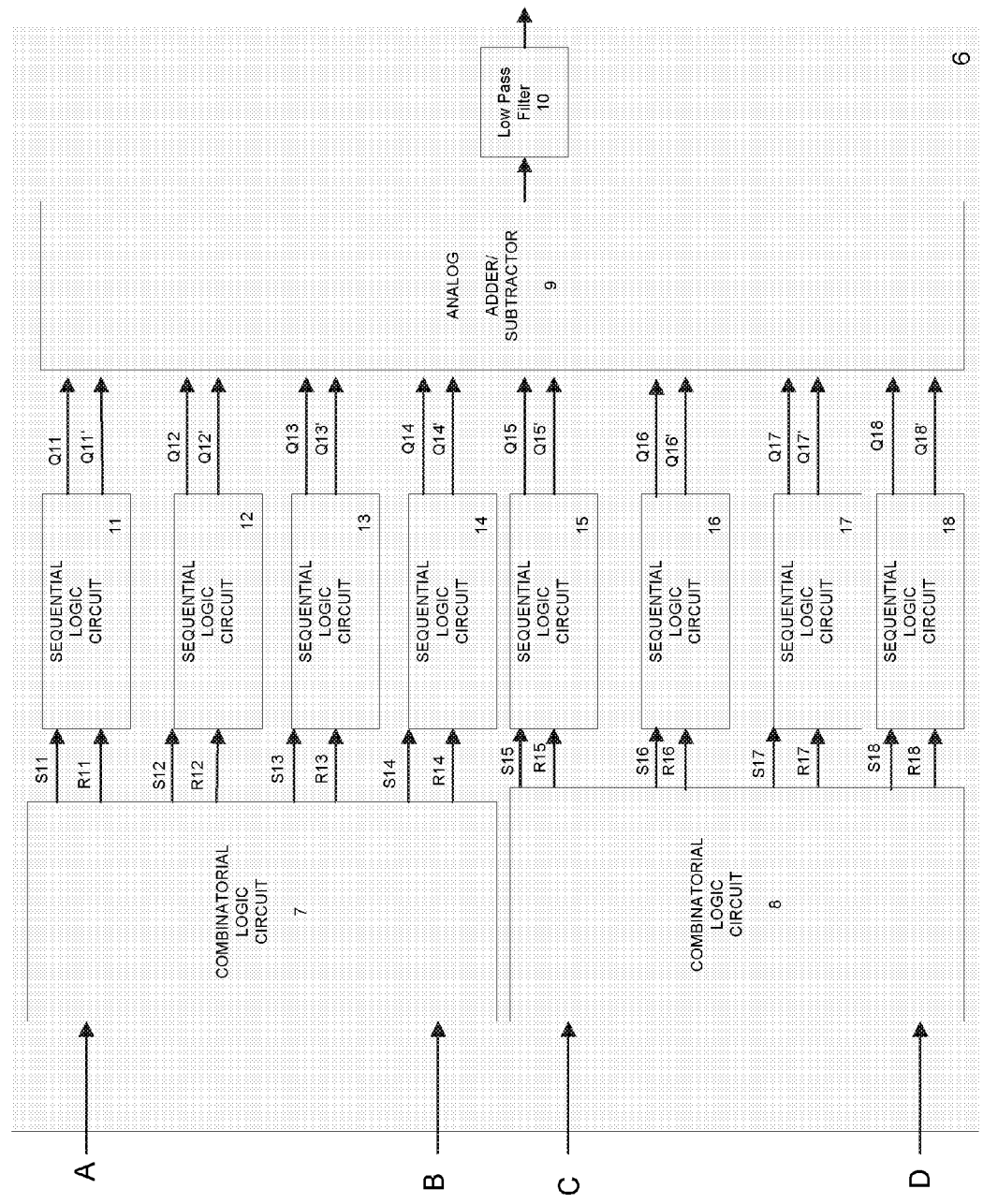
Figure 3:
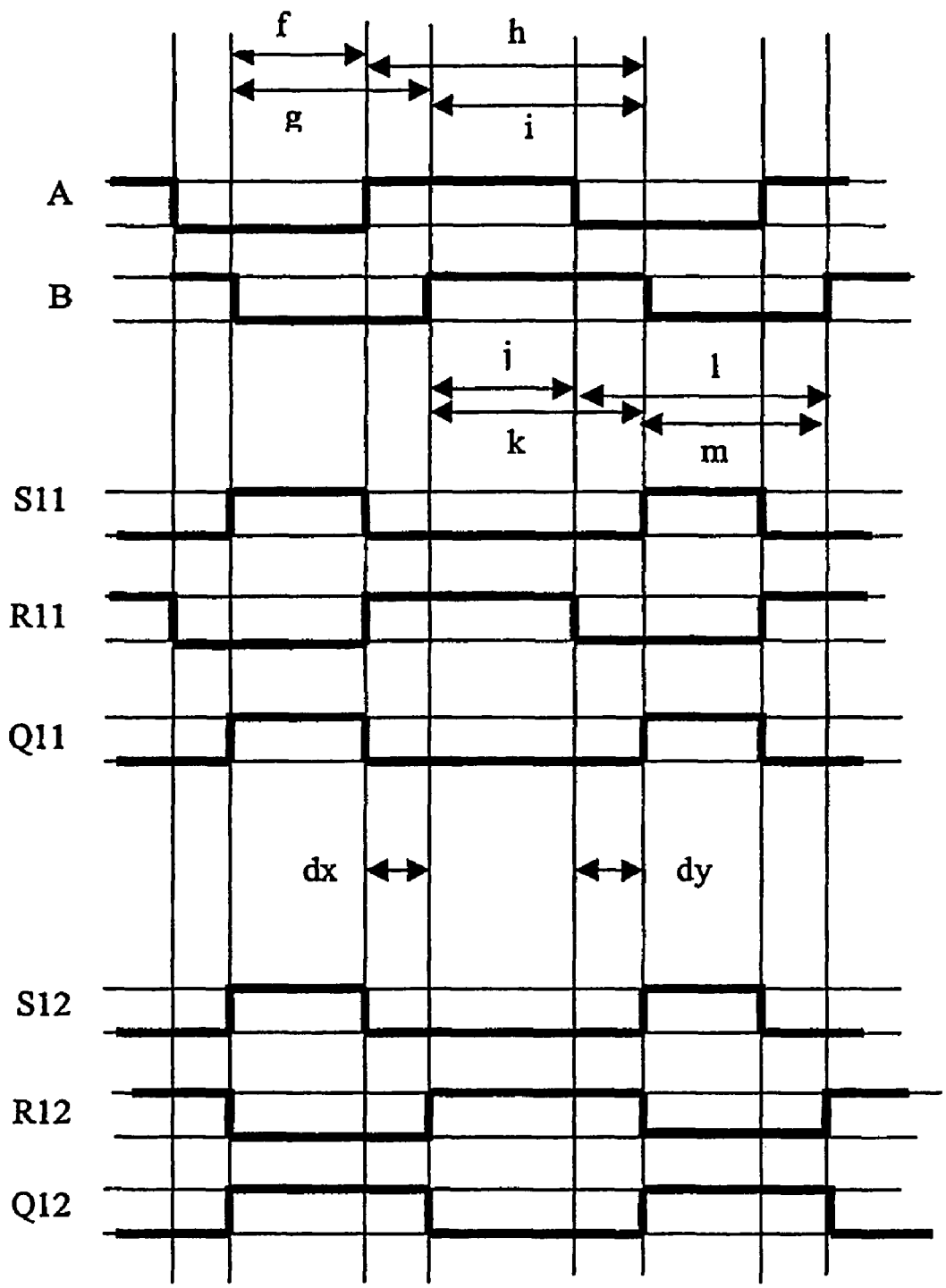

FIG. 1 illustrates in block diagram form an optical disk system according to the invention comprising a delay-difference detector circuit according to the invention, FIG. 2 illustrates in block diagram form a delay-difference detector circuit according to the invention, and FIG. 3 illustrates a timing scheme for two pairs of sequential-logic circuits in a delay-difference detector according to the invention.

Figure 4:
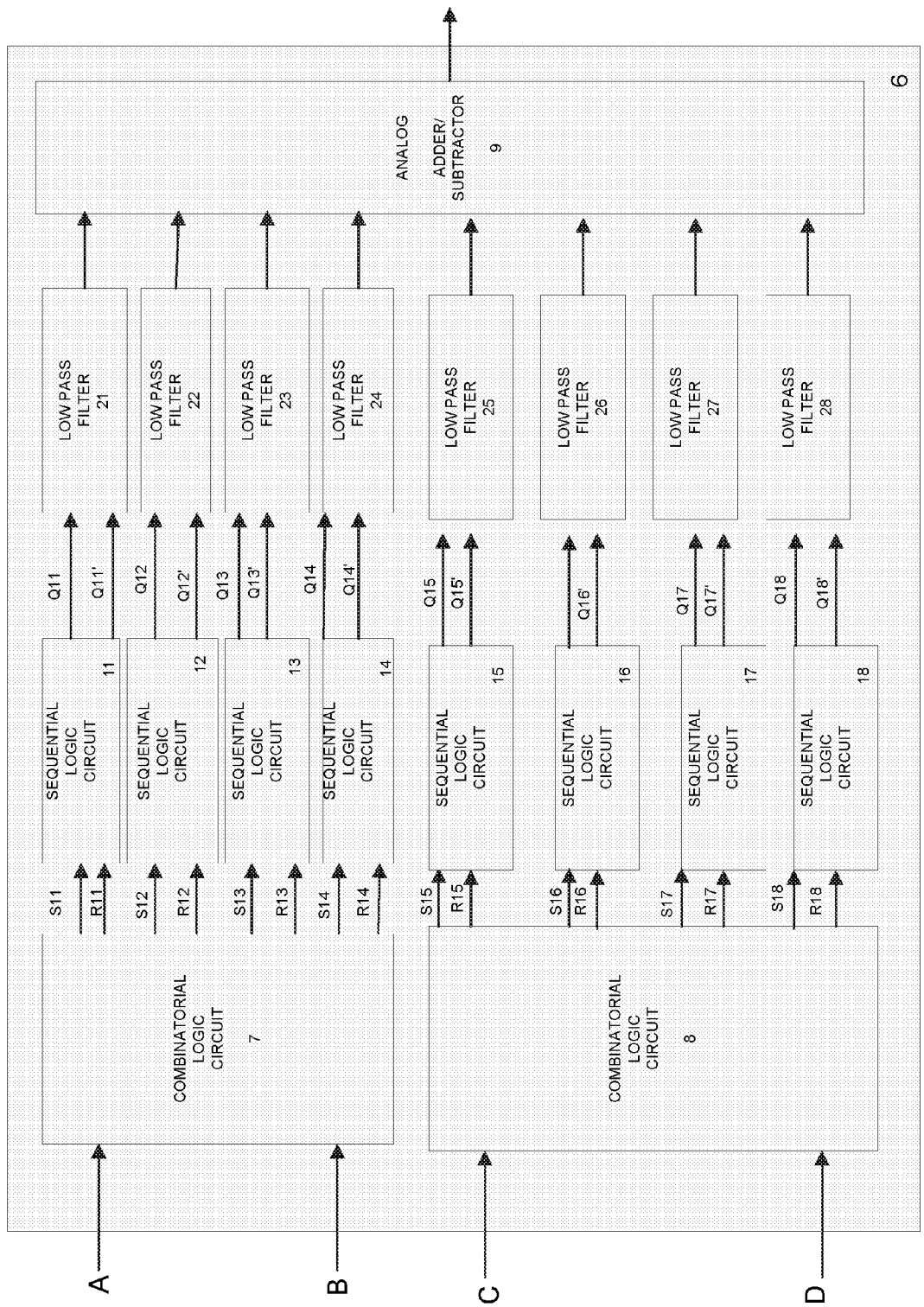

FIG. 4 illustrates in block diagram form a delay-difference detector circuit according to one embodiment of the invention The optical disk system disclosed in FIG. 1 comprises a photo detector 1 comprising four subdetectors each one being coupled via a pre-amplifier to a circuit 2,3,4,5. Outputs of circuits 2,3,4,5 are coupled to inputs of a delay-difference detector 6. The track direction is vertical.

Delay-difference detector 6 disclosed in FIG. 2 comprises combinatorial-logic circuit 7 receiving the output signals A and B from circuits 2 and 3 and generating the output signals S11 and R11 to be supplied to sequential-logic circuit 11 and generating the output signals S12 and R12 to be supplied to sequential-logic circuit 12 and generating the output signals S13 and R13 to be supplied to sequential-logic circuit 13 and generating the output signals S14 and R14 to be supplied to sequential-logic circuit 14. Delay-difference detector 6 further comprises combinatorial-logic circuit 8 receiving the output signals C and D from circuits 4 and 5 and generating the output signals S15 and R15 to be supplied to sequential-logic circuit 15 and generating the output signals S16 and R16 to be supplied to sequential-logic circuit 16 and generating the output signals S17 and R17 to be supplied to sequential-logic circuit 17 and generating the output signals S18 and R18 to be supplied to sequential-logic circuit 18.

Sequential-logic circuit 11 generates an output signal Q11 (and possibly an inverse output signal) to be supplied to analog adder/subtracter 9, sequential-logic circuit 12 generates an output signal Q12 (and possibly an inverse output signal) to be supplied to analog adder/subtracter 9, sequential-logic circuit 13 generates an output signal Q13 (and possibly an inverse output signal) to be supplied to analog adder/subtracter 9, sequential-logic circuit 14 generates an output signal Q14 (and possibly an inverse output signal) to be supplied to analog adder/subtracter 9, sequential-logic circuit 15 generates an output signal Q15 (and possibly an inverse output signal) to be supplied to analog adder/subtracter 9, sequential-logic circuit 16 generates an output signal Q16 (and possibly an inverse output signal) to be supplied to analog adder/subtracter 9, sequential-logic circuit 17 generates an output signal Q17 (and possibly an inverse output signal) to be supplied to analog adder/subtracter 9, and sequential-logic circuit 18 generates an output signal Q18 (and possibly an inverse output signal) to be supplied to analog adder/subtracter 9. An output of adder/subtracter 9 is coupled to an input of a low pass filter 10.

Said combinatorial-logic circuits 7,8 for example comprise inverters, ORs, NORs, ANDs, NANDs etc. and said sequential-logic circuits for example comprise SetResetFlipFlops etc. But other kinds of combinatorial-logic circuits and other kinds of sequential-logic circuits are not to be excluded.

Delay-difference detector 6 as shown in FIG. 2 comprises two separate detectors for detecting delay-differences, generally at least one will be present, more than two like three or four etc. are however not to be excluded.

The invention as shown in FIGS. 1 and 2 in view of FIG. 3 functions as follows. Photo detector 1 comprises four subdetectors, each one coupled via its own pre-amplifier to its own circuit 2-5. Each circuit 2-5 comprises for example a variable gain amplifier and a slicer, and generates an amplified sliced detection signal A-D to delay-difference detector 6.

In delay-difference detector 6, a combinatorial-logic circuit 7 receives said amplified sliced detection signals A and B which are shown in FIG. 3, and generates signals S11 and R11 to be supplied to sequential-logic circuit 11 and S12 and R12 to be supplied to sequential-logic circuit 12, which are shown in FIG. 3. S11 for example corresponds with A'·B' (with A' and B' being the inverse values of A and B respectively) to be realized for example via an inverter receiving A and an inverter receiving B and outputs of said inverters being coupled to inputs of an AND, with an output of said AND supplying S11. R11 for example corresponds with A. Then the output signal Q11 of sequential-logic circuit 11 corresponds with a pulse of width f. S12 for example corresponds with A'·B' (with A' and B' being the inverse values of A and B respectively) to be realized for example via an inverter receiving A and an inverter receiving B and outputs of said inverters being coupled to inputs of an AND, with an output of said AND supplying S12 (due to signals S11 and S12 being equal, said inverters and said AND could be used for both signals). R12 for example corresponds with B. Then the output signal Q12 of sequential-logic circuit 12 corresponds with a pulse of width g.

Adder/subtracter 9 subtracts both signals Q11 and Q12 resulting in a small pulse dx=g−f=h−i, with this delay difference being based upon rising edges of A and B. In a corresponding way, a delay difference dy=k−j=l−m can be got based upon falling edges of A and B. By using a first pair of sequential-logic circuits (11,12,15,16) for detecting delay differences between rising edges and using a second pair of sequential-logic circuits (13,14,17,18) for detecting delay differences between falling edges, thereby using both kinds of edges, the influence of time-jitter is less compared to the situation where just one kind of edge is used. Said analog adder/subtracter 9 establishes the differences (the small pulses) between the sequential-logic circuit output signals of each one of said pairs of sequential-logic circuits, and establishes the sum of said differences (small pulses situated next to each other). The analog adder/subtracter may be in the form of a node ($\Sigma I=0$) with for example a current-to-voltage converter like for example a resistor for converting currents into voltages (in case of said sequential-logic circuit outputs generating currents or in case of said sequential-logic circuit outputs generating voltages to be supplied to voltage-to-current converters).

Said low pass filter filters said small pulses situated next to each other for getting a control signal for controlling said optical disk system (track following).

Both sequential-logic circuits 11 and 12 are set simultaneously when signals A and B both have gone low. Sequential-logic circuit 11 is reset when signal A goes high. Sequential-logic circuit 12 is reset when signal B goes high. Then both sequential-logic circuits 11 and 12 are set again when signals A and B both have gone low etc.

With the track direction being vertical, the radial tracking error RE=[$\Delta\tau(B,A)+\Delta\tau(D,C)$]/T.

With reference now to FIG. 4, there is shown an alternate embodiment of the delay-difference detector 6 of FIG. 2, comprising combinatorial-logic circuit 7 receiving the output signals A and B from circuits 2 and 3 and generating the output signals S11 and R11 to be supplied to sequential-logic circuit 11 and generating the output signals S12 and R12 to be supplied to sequential-logic circuit 12 and generating the output signals S13 and R13 to be supplied to sequential-logic circuit 13 and generating the output signals S14 and R14 to be supplied to sequential-logic circuit 14. Delay-difference detector 6 further comprises combinatorial-logic circuit 8 receiving the output signals C and D from circuits 4 and 5 and generating the output signals S15 and R15 to be supplied to sequential-logic circuit 15 and generating the output signals S16 and R16 to be supplied to sequential-logic circuit 16 and generating the output signals S17 and R17 to be supplied to sequential-logic circuit 17 and generating the output signals S18 and R18 to be supplied to sequential-logic circuit 18.

Sequential-logic circuit 11 generates an output signal Q11 (and possibly an inverse output signal) to be supplied to low pass filter 21, sequential-logic circuit 12 generates an output signal Q12 (and possibly an inverse output signal) to be supplied to low pass filter 22, sequential-logic circuit 13 generates an output signal Q13 (and possibly an inverse output signal) to be supplied to low pass filter 23, sequential-logic circuit 14 generates an output signal Q14 (and possibly an inverse output signal) to be supplied to low pass filter 24, sequential-logic circuit 15 generates an output signal Q15 (and possibly an inverse output signal) to be supplied to low pass filter 25, sequential-logic circuit 16 generates an output signal Q16 (and possibly an inverse output signal) to be supplied to low pass filter 26, sequential-logic circuit 17 generates an output signal Q17 (and possibly an inverse output signal) to be supplied to low pass filter 27, and sequential-logic circuit 18 generates an output signal Q18 (and possibly an inverse output signal) to be supplied to low pass filter 28. An output of low pass filters 21-28 is coupled to an input of analog adder/subtracter 9.

The invention is based upon an insight, inter alia, that in optical disk systems, the sliced amplified detection signals will have the same frequency, which allows the use of low complex (and delaylineless) delay-difference detectors, and is based upon a basic idea, inter alia, that such a low complex delay-difference detector can be realized by solely using combinatorial-logic circuits like for example inverters, ORs, NORS, ANDs, NANDs etc. and sequential-logic circuits like for example SetResetFlipFlops etc.

The invention solves the problem, inter alia, of providing an optical disk system in which the delay-difference detector is of the lowest complexity, and is advantageous, inter alia, in that such a delay-difference detector can be integrated on the photo detector integrated-circuit well, and hardly requires programmability and functions at lowest power dissipation.

Photo detector 1 may comprise two, four or six or more subdetectors, said pre-amplifiers may be integrated with said subdetectors or with said circuits 2-5 or may be left out. Differential time delay-difference detector 6 can entirely or partly be integrated with circuits 2-5.

Summarizing, optical disk systems comprising photo detectors 1 for detecting optical disks comprising amplifiers and slicers 2-5 and delay-difference detectors 6 for detecting delay differences in sliced amplified detection signals are improved by installing delaylineless delay-difference detectors 6 comprising combinatorial-logic circuits 7,8 like for example inverters, ORs, NORs, ANDS, NANDs etc. and sequential-logic circuits 11-18 like for example SetReset-FlipFlops etc. Without the prior art delay lines, said delay-difference detectors 6 are of a lower complexity and low costly and can be well integrated. By introducing a first pair of sequential-logic circuits 11,12,15,16 for detecting delay differences between rising edges and a second pair of sequential-logic circuits 13,14,17,18 for detecting delay differences between falling edges, both kinds of edges are being used and the influence of time-jitter is less compared to the situation where just one kind of edge is used. Said delay-difference detector 6 further comprises an analog adder/subtracter 9 for adding/subtracting sequential-logic circuit output signals and low pass filter(s) 10 located before or after said adder/subtracter 9.

Preferably, photo detector 1 comprises several like for example four or more subdetectors segmented by division lines which are positioned as tilted by an angle in a range 45±(0-40) degrees with respect to a track direction for said generating of detection signals for reading data from said optical disk. In other words, said division lines are not positioned radially or tangentially with respect to the track direction. As a result, a higher cross-talk suppression and a larger radial-tilt margin are got (due to the overlap of the radial first orders (0,1) and (0,−1) with the zeroth order (0,0) now to a larger extent being present in some of the subdetector areas and to a less extent being present in the other subdetector areas which other subdetector areas are used to derive the RF data signal), a boosting of most critical high frequency signals is got (due to the overlap of the tangential first orders (1,0) and (−1,0) with the zeroth order (0,0) now to a larger extent being present in some of the subdetector areas and to a less extent being present in the other subdetector areas), and a higher signal-to-noise ratio is got (due to, for making the RF data signal, using some of the subdetector areas to a larger extent and using the other subdetector areas to a less extent, as a result the total photo detector capacitance is reduced).

It should be noted that U.S. Pat. No. 5,901,120 discloses a photo detector comprising four subdetectors segmented by division lines which are positioned as tilted by an angle in a range 45±25 degrees with respect to a track direction. But this is just for detecting a moving direction and not for reading data from the optical disk.

The invention claimed is:

1. An optical disk system comprising at least one photo detector comprising several sub-detectors for detecting at least a part of said optical disk, said several sub-detectors of said at least one photo detector generating respective detection signals in response to said detection, each of said respective detection signals being output to only one of several circuits of the optical disk system, each circuit having an input directly coupled to a respective output of only one of said several sub-detectors for receiving said detection signals, said several circuits comprised of at least one amplifier for amplifying detection signals and comprising at least one slicer for slicing amplified detection signals, the system further comprising at least one delay-difference detector for detecting delay differences in sliced amplified detection signals, characterized in that said delay-difference detector is delayline-less and comprises combinatorial-logic circuits and sequential-logic circuits ,said combinatorial-logic circuits for receiving output signals from said several sub-detectors and for generating signal pairs to be supplied to one of a first pair or a second pair of sequential logic circuits, said sequential logic circuits generating sequential logic circuit output signal pairs to be supplied directly to at least one analog adder/subtractor for adding/subtracting said sequential logic circuit output signal pairs.

2. An optical disk system according to claim 1, wherein said delay-difference detector comprises said first pair of sequential-logic circuits for detecting delay differences between rising edges and said second pair of sequential-logic circuits for detecting delay differences between falling edges, wherein said first pair of sequential-logic circuits detects delay difference between rising edges and the second pair of sequential-logic circuits detects delay differences between falling edges.

3. An optical disk system according to claim 1, wherein said delay-difference detector comprises at least one low pass filter coupled to an output of said at least one analog adder/subtractor.

4. A delay-difference detector for use in an optical disk system comprising at least one photo detector comprising several sub-detectors for detecting at least a part of said optical disk, said several sub-detectors of said at least one photo detector generating respective detection signals in response to said detection, each of said respective detection signals being output to only one of several circuits, each circuit having an input directly coupled to a respective output of only one of said several sub-detectors for receiving said detection signals, each of said several circuits comprising at least one amplifier for amplifying detection signals and comprising at least one slicer for slicing amplified detection signals and comprising at least one delay-difference detector for detecting delay differences in sliced amplified detection signals, wherein said delay-difference detector is delaylineless and comprises combinatorial-logic circuits and sequential-logic circuits, said combinatorial-logic circuits for receiving output signals from said several sub-detectors and for generating signal pairs to be supplied to one of a first pair or a second pair of sequential logic circuits, said sequential logic circuits generating sequential logic circuit output signal pairs to be supplied directly to at least one analog adder/subtractor for adding/subtracting said sequential logic circuit output signal pairs.

5. A delay-difference detector according to claim 4, wherein said delay-difference detector comprises said first pair of sequential-logic circuits for detecting delay differences between rising edges and comprises said second pair of sequential-logic circuits for detecting delay differences between falling edges, wherein said first pair of sequential-logic circuits detects delay difference between rising edges and the second pair of sequential-logic circuits detects delay differences between falling edges.

6. A method for use in an optical disk system for providing delay-difference detection without requiring delaylines, comprising the steps of:
   detecting at least a part of said optical disk using at least one photo detector comprised of at least several sub-detectors;
   generating detection signals from said at least several sub-detectors, responsive to said detection;
   outputting a respective one of said detection signals from said at least several sub-detectors to only one of at least several circuits of said optical disk system;
   independently amplifying said detection signals from each of said at least several sub-detectors to generate amplified detection signals;
   slicing said amplified detection signals to generate sliced amplified detection signals; and
   detecting delay differences in said sliced amplified detection signals;
   wherein said detecting step of detecting delay differences is delaylineless and comprise combinatorial logic circuits and sequential logic circuits, said combinatorial-logic circuits for receiving output signals from said several sub-detectors and for generating signal pairs to be supplied to one of a first pair or a second pair of sequential logic circuits, said sequential logic circuits generating sequential logic circuit output signal pairs to be supplied directly to at least one analog adder/subtractor for adding/subtracting said sequential logic circuit output signal pairs.

7. A Method according to claim 6, wherein said step of detecting delay differences in said sliced amplified detection signals further comprises: detecting delay differences between rising edges and detecting delay differences between falling edges in said sliced amplified detection signals.

8. An optical disk system comprising at least one photo detector further comprising several sub-detectors for detecting at least a part of said optical disk, said several sub-detectors of said at least one photo detector generating respective detection signals in response to said detection, each of said respective detection signals being output to only one of several circuits of the optical disk system, each circuit having an input directly coupled to a respective output of only one of said several sub-detectors for receiving said detection signals, said several circuits comprised of at least one amplifier for amplifying detection signals and comprising at least one slicer for slicing amplified detection signals, the system further comprising at least one delay-difference detector for detecting delay differences in sliced amplified detection signals, characterized in that said delay-difference detector is delaylineless and comprises combinatorial-logic circuits and sequential-logic circuits, said combinatorial-logic circuits for receiving output signals from said several sub-detectors and for generating signal pairs to be supplied to one of a first pair or a second pair of sequential logic circuits, said sequential logic circuits generating sequential logic circuit output signal pairs to be supplied directly to at least one low pass filter, said at least one low pass filter outputting filtered sequential logic circuit output signal pairs directly to at least one analog adder/subtractor for adding/subtracting said filtered sequential logic circuit output signal pairs.

* * * * *